(12) United States Patent
Kambayashi et al.

(10) Patent No.: US 9,375,662 B2
(45) Date of Patent: Jun. 28, 2016

(54) SUSPENSION PROCESSING DEVICE USING ULTRASONIC WAVES

(71) Applicants: Hitachi, Ltd., Chiyoda-ku, Tokyo (JP); Tokyo Institute of Technology, Meguro-ku, Tokyo (JP)

(72) Inventors: Takuya Kambayashi, Tokyo (JP); Kentaro Nakamura, Tokyo (JP)

(73) Assignees: Hitachi, Ltd., Tokyo (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 14/425,929

(22) PCT Filed: Aug. 7, 2013

(86) PCT No.: PCT/JP2013/071387
§ 371 (c)(1),
(2) Date: Mar. 4, 2015

(87) PCT Pub. No.: WO2014/050320
PCT Pub. Date: Apr. 3, 2014

(65) Prior Publication Data
US 2015/0209696 A1 Jul. 30, 2015

(30) Foreign Application Priority Data

Sep. 26, 2012 (JP) ................................. 2012-211744
Jun. 12, 2013 (JP) ................................. 2013-123931

(51) Int. Cl.
*B01D 21/28* (2006.01)
*B01D 43/00* (2006.01)
(Continued)

(52) U.S. Cl.
CPC .............. *B01D 21/283* (2013.01); *B01D 43/00* (2013.01); *B01J 19/10* (2013.01); *C02F 1/36* (2013.01); *B01D 2021/0081* (2013.01)

(58) Field of Classification Search
CPC .......... B01D 43/00; B01D 21/28; C02F 1/36; B01J 19/10
See application file for complete search history.

(56) References Cited

U.S. PATENT DOCUMENTS

| 3,076,544 A | 2/1963 | Bodine, Jr. |
| 4,743,361 A | 5/1988 | Schram |

(Continued)

FOREIGN PATENT DOCUMENTS

| JP | 61-500278 A | 2/1986 |
| JP | 2-503528 A | 10/1990 |

(Continued)

OTHER PUBLICATIONS

International Search Report (PCT/ISA/210) dated Oct. 15, 2013 with English translation (five pages).

*Primary Examiner* — Walter D Griffin
*Assistant Examiner* — Cameron J Allen
(74) *Attorney, Agent, or Firm* — Crowell & Moring LLP

(57) ABSTRACT

A suspension processing method using ultrasonic waves has problems in that movement of solids in liquid do not follow movement of the sound field. Accordingly, application to a field that requires a high suspension processing performance or a high flow rate process is difficult. In order to achieve the high suspension processing performance, a design of adopting a long and large oscillator and the like is required. A suspension processing device (30) of separating and concentrating a component of solids in suspension (1a) using ultrasonic waves, includes: at least one supply port (32) for supplying the suspension (1a) into the device; a channel (31) through which the suspension flows; at least two outlet ports (33 and 34) for discharging processed suspension (1a); an oscillator (35) for emitting ultrasonic waves; and a reflection plate (36) for reflecting the emitted ultrasonic waves.

12 Claims, 18 Drawing Sheets

(51) Int. Cl.
  *B01J 19/10* (2006.01)
  *C02F 1/36* (2006.01)
  *B01D 21/00* (2006.01)

(56) References Cited

U.S. PATENT DOCUMENTS 5,085,783 A * 2/1992 Feke .................... B01D 21/283
                                                              210/243
5,164,094 A    11/1992 Stuckart 6,055,859 A    5/2000 Kozuka et al.
6,818,128 B2 * 11/2004 Minter .................... C02F 1/36
                                                              181/142
2010/0206818 A1 * 8/2010 Leong ................. B01D 21/283
                                                              210/748.05

FOREIGN PATENT DOCUMENTS

JP          2723182 B1      3/1998
JP          2004-24959 A    1/2004

* cited by examiner

CLEAR LIQUID TURBIDITIES

SUSPENSION PROCESSING DEVICE USING ULTRASONIC WAVES

TECHNICAL FIELD

The present invention relates to a suspension processing device using ultrasonic waves.

BACKGROUND ART

The background arts in this technical field include Japanese Patent No. 2723182 Publication (Patent Literature 1). This publication describes "for capturing fine objects in a liquid medium by aligning them at half-wave length intervals at nodes of sound pressure in a standing wave sound field, a back electrode of an ultrasonic oscillator is made of multiple strip electrode pieces independently arranged parallel with each other, and such an electrode piece to which voltage is applied is electrically switched to an adjacent electrode piece to move a driving part of the ultrasonic oscillator and move the standing wave sound field, thereby moving the captured fine objects along the arrangement direction of the electrode pieces." (see Abstract).

The arts also include Japanese Patent Laid-Open Publication No. 2004-24959 (Patent Literature 2). This publication describes "an ultrasonic noncontact filtering method and apparatus therefor where a ultrasonic oscillator and a reflection plate are arranged in parallel with each other in and along a flow path filled with a liquid medium, emitted ultrasonic waves are reflected by the reflection plate, and fine objects dispersed in the liquid medium are captured at nodes of sound pressure or antinodes of the sound pressure of a standing wave sound field generated in the flow path" (see Abstract).

CITATION LIST

Patent Literature

Patent Literature 1: Japanese Patent Publication No. 2723182
Patent Literature 2: Japanese Patent Laid-Open Publication No. 2004-24959

SUMMARY OF INVENTION

Technical Problem

Patent Literature 1 describes a method of concentrating and filtering fine particles in suspension using ultrasonic waves oscillated by a rectangular oscillator including multiple electrodes (hereinafter, the foregoing method is described as a suspension processing method). However, the suspension processing method of Patent Literature 1 has problems in that movement of solids in liquid do not follow movement of the sound field. Accordingly, application to a field that requires a high processing performance (a performance of concentrating suspension and a clearing performance) or a high flow rate process is difficult.

Furthermore, as described in Patent Literature 2, even with a single oscillator, modulation of an input signal can concentrate and separate solids in liquid. However, the oscillator is arranged parallel to the flow of liquid to be processed. Accordingly, the solids are transported during processes. In order to achieve a high processing performance, a design of configuring a long or large oscillator is required.

The present invention thus provides a suspension processing device that achieves a high processing performance without need to enlarge the oscillator.

Solution to Problem

In order to solve the problems, for instance, configurations according to Claims are adopted.

The present application includes multiple solutions to the problems. One example of the solutions may be a suspension processing device using ultrasonic waves, the device including: an oscillator and a reflection plate in and orthogonal to a flow path filled with a liquid medium; and an outlet port in the flow path sandwiched by the oscillator and the reflection plate.

Advantageous Effect of Invention

The present invention enables a suspension processing device using ultrasonic waves to have a high suspension processing performance without enlarging the oscillator. Problems, configurations and advantageous effects other than those described above are apparent through description of the following embodiments.

DESCRIPTION OF EMBODIMENTS

Embodiments are hereinafter described using the drawings.

EMBODIMENTS

Embodiment 1

Figure 1:
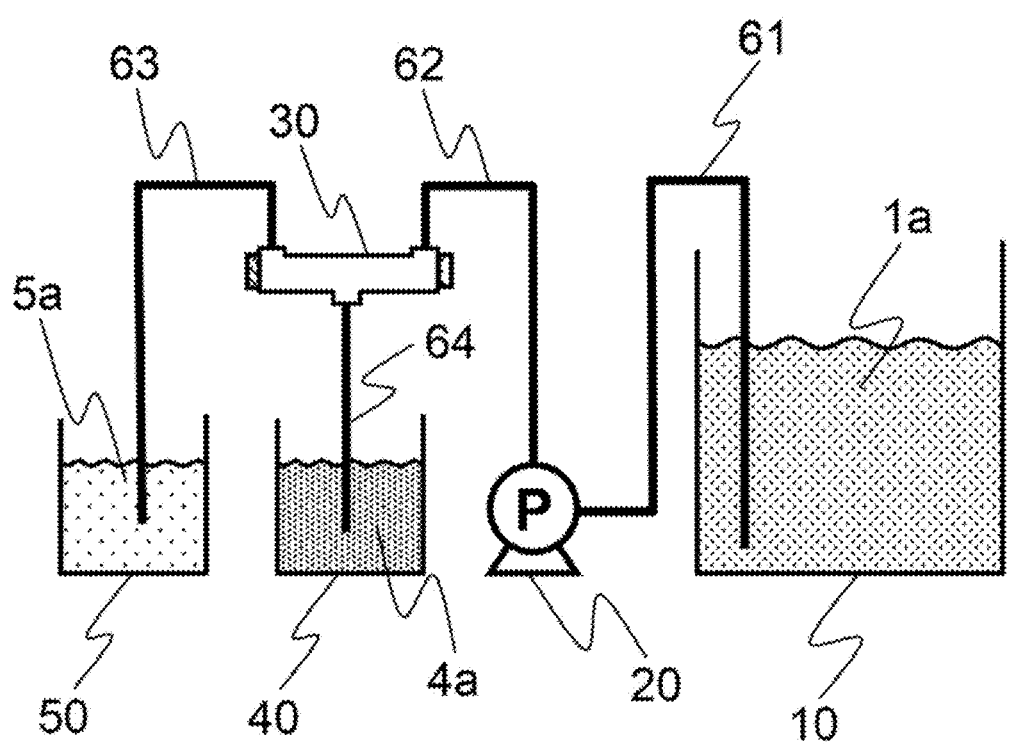
FIG. 1 shows an example of a process configuration diagram in the case of using a suspension processing device using ultrasonic waves.
Figure 2:
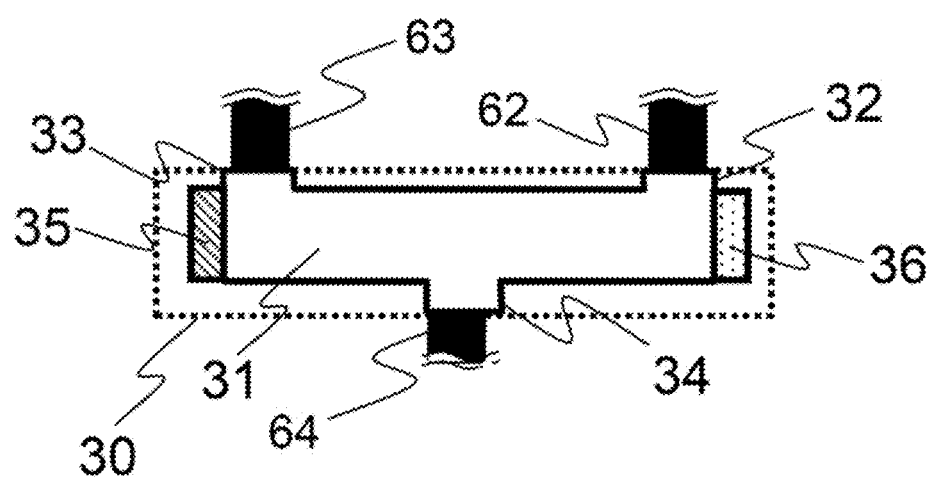
FIG. 2 is a configuration diagram of a suspension processing device of Embodiment 1 using ultrasonic waves.

In this embodiment, an example of a suspension processing device using ultrasonic waves is described.
(Configuration of Suspension Processing Device)
FIG. 1 shows an example of a process configuration in the case of using the suspension processing device using ultrasonic waves.
FIG. 2 is a configuration diagram of the suspension processing device using ultrasonic waves.

A tank 10 is filled with suspension 1a. The tank 10 communicates with a pump 20 through a liquid feeding tube 61. The suspension 1a fed to the pump 20 through the liquid feeding tube 61 passes through a liquid feeding tube 62, and is supplied to the suspension processing device 30.

As shown in FIG. 2, the suspension processing device 30 includes a channel 31, a supply port 32 that communicates with the liquid feeding tube 62, an outlet port 33 that communicates with a liquid feeding tube 63, a concentrate port 34 that communicates with a liquid feeding tube 64, an oscillator 35 that generates ultrasonic waves, and a reflection plate 36 that reflects ultrasonic waves.

The supply port 32 is arranged upward at an upstream end of the channel 31 such that the flow directions of the suspension 1a in the liquid feeding tube 62 and the channel 31 are different from each other. The outlet port 33 is arranged upward at a downstream end of the channel such that the flow directions of the suspension 1a in the liquid feeding tube 63 and the channel 31 are different from each other. The oscillator 35 and the reflection plate 36 at the opposite ends on the upstream side and the downstream side so as to sandwich the channel 31 of the suspension processing device 30. The oscillator 35 has an oscillating surface arranged so as to emit ultrasonic waves to the suspension in the channel 31.

Figure 3:
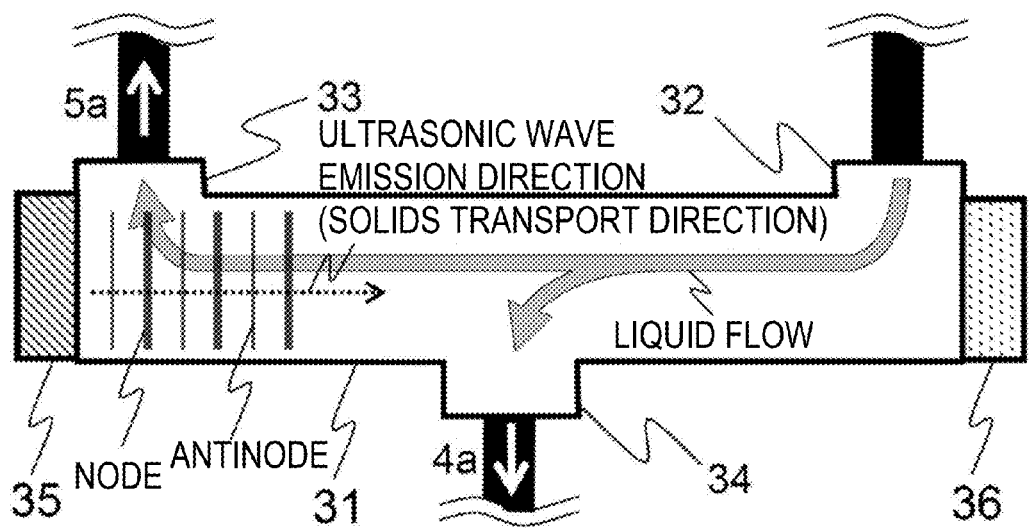
FIG. 3 is a diagram illustrating a suspension processing device using ultrasonic waves.

The concentrate port 34 is disposed downward at the channel 31 between the supply port 32 and the outlet port 33. The outlet port 33 communicates with the liquid feeding tube 63. The liquid having passed through the liquid feeding tube 63 is discharged into a tank 50 in FIG. 1. The concentrate port 34 communicates with the liquid feeding tube 64. The liquid having passed through the liquid feeding tube 64 is discharged into a tank 40 in FIG. 1. The suspension 1a, supplied from the supply port 32 to the channel 31, passes through this channel 31 and is then discharged to the outside of the suspension processing device 30 from the outlet port 33 or the concentrate port 34.
(Operation/Process)
FIG. 3 is a diagram for illustrating an operation principle.

The oscillator 35 and the reflection plate 36 are thus arranged opposite to each other so as to sandwich the channel 31, and ultrasonic waves are emitted into the channel 31, thereby forming a standing wave in the channel 31. Accordingly, regions with high sound pressure (nodes) and regions with low sound pressure (antinodes) cyclically appear along the channel 31.

At this time, if liquid that fills the channel 31 contains solids sufficiently small in comparison with the intervals between antinodes and nodes (hereinafter, referred to as solids), the solids receive forces toward the nodes or antinodes according to the physical property values of the solids and are captured at the positions of antinodes or nodes in the channel 31.

The captured solids can be transported in the channel 31 in the direction from the oscillator 35 to the reflection plate 36 or from the reflection plate 36 to the oscillator 35 by modulating ultrasonic waves.

The captured solids flocculate during transportation. Accordingly, when the solids are grown to have a certain size, the floccules settle to the bottom of the channel 31 by their own weights. The position of settling of flocculated solids depends on the flow velocity of the suspension 1a flowing in the channel 31 and the modulation speed of ultrasonic waves. The concentrate port 34 is thus provided around the settling position, thereby allowing most of solids having settled by their own weights to be selectively collected.

As described above, the suspension 1a supplied to the channel 31 passes through this channel 31, to which the ultrasonic waves are emitted, thereby enabling the suspension to be separated into clear liquid 5a with a small number of solids in the liquid and concentrate liquid 4a with a large number of solids in the liquid and then collected. Here, the transport direction of the captured solids and the flowing direction of the liquid in the channel 31 are configured opposite to each other. This configuration can prevent the captured solids from flowing to the downstream. Accordingly, separation and concentration performances can be improved. The clear liquid 5a passes through the outlet port 33 and the liquid feeding tube 63 and is discharged into the tank 50. The concentrate liquid 4a passes through the concentrate port 34 and the liquid feeding tube 64 and is discharged into the tank 40.

Advantageous Effects

Advantageous effects (processing performance) in the case of using the suspension processing device are described below. The processing performance of the suspension processing device is evaluated with reference to the turbidity of sample liquid discharged from the outlet port 33 and the concentrate port 34. The adopted sample liquid and output conditions of ultrasonic waves are as follows.
(1) Sample liquid: suspension that contains pure water and alumina particles having an average particle diameter of 15 micrometers dispersed therein (average turbidity: 17.3 degrees).
(2) Ultrasonic waves: a sinusoidal wave having frequencies from 2 to 3 MHz modulated at five-second intervals is generated by a function generator, amplified by a power amplifier and input into the oscillator 35.

Figure 4:
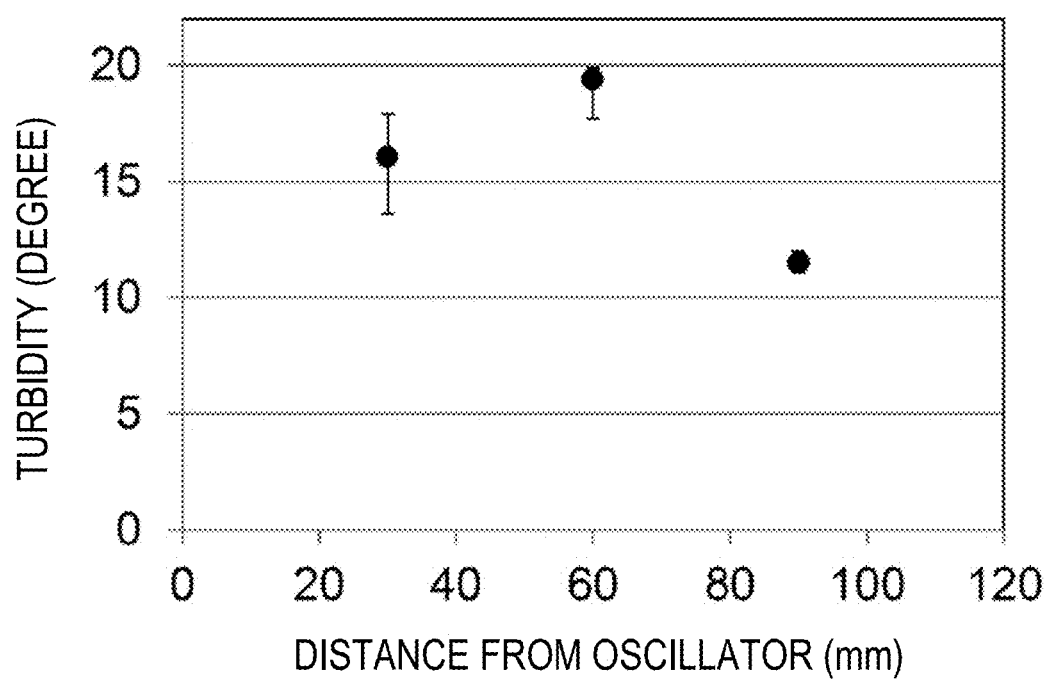
FIG. 4 is a diagram showing a result of Embodiment 1.
Figure 5A:
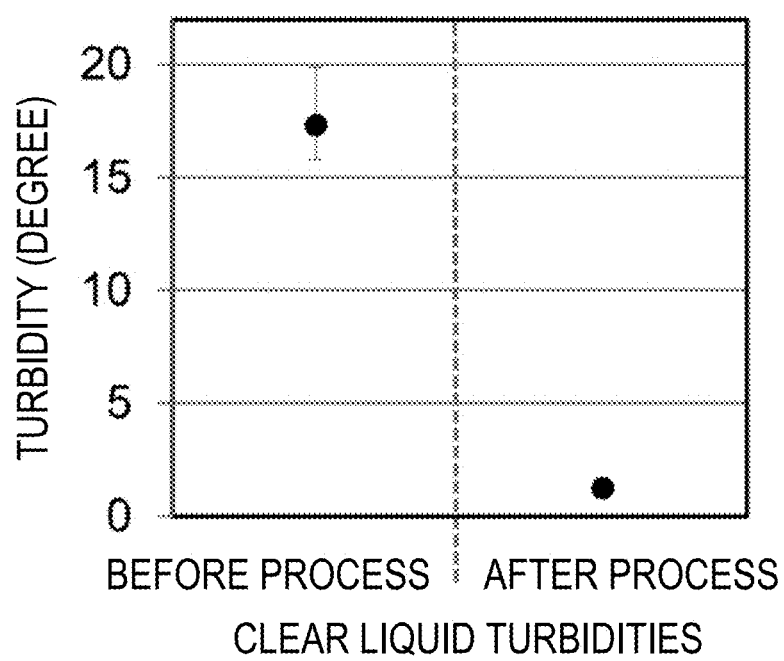
FIG. 5A is a diagram of comparison between clear liquid turbidities before and after the process of Embodiment 1.
Figure 5B:
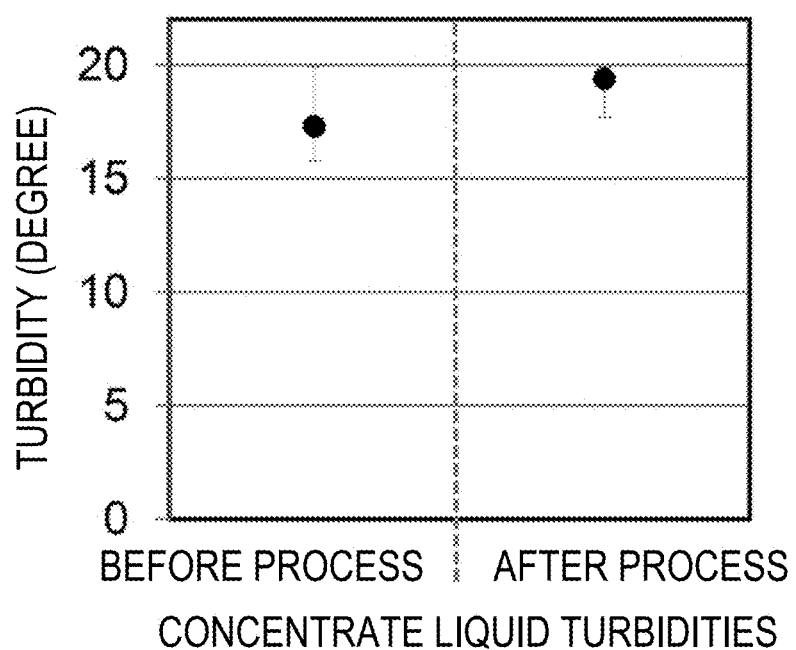
FIG. 5B is a diagram of comparison between concentrate liquid turbidities before and after the process of Embodiment 1.

FIGS. 4, 5A and 5B show processing results of the sample liquid by the suspension processing device in FIG. 2. FIG. 4 shows a relationship between the distance of the concentrate port 34 from the oscillator 35 and the turbidity of suspension discharged from the concentrate port 34. As shown in FIG. 4, in the case of disposing the concentrate port 34 at a position of a distance of 60 mm from the oscillator 35, the turbidity of suspension discharged from the concentrate port 34 is higher than an initial turbidity (17.3 degrees). Solids in the liquid are thus concentrated and discharged.

FIGS. 5A and 5B show processing results of the sample liquid by the suspension processing device in FIG. 2. FIGS. 5A and 5B show change in the respective turbidities of the sample liquid discharged from the outlet port 33 and the sample liquid discharged from the concentrate port 34.

In the case where the turbidity of the sample liquid supplied to the suspension processing device is 17.3 degrees (equivalent to the turbidity of sports drink), the turbidity of the sample liquid discharged from the outlet port 33 is reduced to 1.2 degrees (guideline value for tap water<2 degrees), while the turbidity of the sample liquid discharged from the concentrate port 34 is increased to 19.4 degrees. The above evaluation result suggests that the number of alumina particles in the sample liquid discharged from the outlet port 33 decreases from that before the process while the number of alumina particles in the sample liquid discharged from the concentrate port 34 increases from that before the process. Such use of the suspension processing device in FIG. 2 can separate the suspension into clear liquid (liquid discharged from the outlet port 33) having a small solids component and concentrate liquid (liquid discharged from the concentrate port 34) having a concentrated solids component.

Embodiment 2

Figure 6:
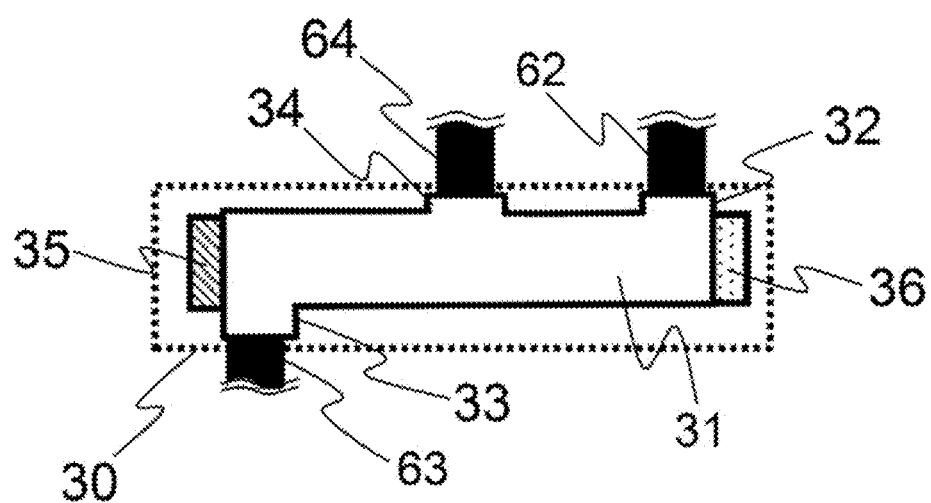
FIG. 6 is a configuration diagram of a suspension processing device of Embodiment 2 using ultrasonic waves.

In this embodiment, an example of a suspension processing device of Embodiment 2 using ultrasonic waves is described.
(Configuration of Suspension Processing Device)
FIG. 6 is a configuration diagram of a suspension processing device using ultrasonic waves.

The suspension processing device 30 includes a channel 31, a supply port 32 that communicates with a liquid feeding tube 62, an outlet port 33 that communicates with a liquid feeding tube 63, a concentrate port 34 that communicates with a liquid feeding tube 64, an oscillator 35 that generates ultrasonic waves, and a reflection plate 36 that reflects ultrasonic waves.

The supply port 32 is arranged upward at an upstream end of the channel 31 such that the flow directions of the suspension 1a in the liquid feeding tube 62 and the channel 31 are different from each other. The outlet port 33 is arranged downward at a downstream end of the channel such that the flow directions of the suspension 1a in the liquid feeding tube 63 and the channel 31 are different from each other. The oscillator 35 and the reflection plate 36 are arranged at opposite ends of the channel 31 of the suspension processing device 30 on the upstream side and the downstream side so as to sandwich this channel. The concentrate port 34 is disposed upward at the channel 31 between the supply port 32 and the outlet port 33.
(Operation/Process/Advantageous Effect)

The oscillator 35 and the reflection plate 36 are thus arranged parallel to each other so as to sandwich the channel 31, and ultrasonic waves are emitted into the channel 31, thereby forming a standing wave in the channel 31. Accordingly, regions with high sound pressure (nodes) and regions with low sound pressure (antinodes) cyclically appear along the channel 31.

At this time, in the case where the channel 31 is filled with emulsion that contains droplets and a parent phase and the droplets are sufficiently small with respect to the intervals between antinodes and nodes, the droplets receive forces toward the antinodes or nodes according to the physical property values of the droplets and are then captured at the positions of antinodes or nodes in the channel 31. The captured droplets can be transported in the channel 31 in the direction from the oscillator 35 to the reflection plate 36 or from the reflection plate 36 to the oscillator 35 by modulating ultrasonic waves.

The captured droplets flocculate during transportation. If the droplets have smaller densities than the parent phase has, the flocculated droplets float upward. The floating position depends on the flow velocity in the channel 31 and the modulation speed of ultrasonic waves. The concentrate port 34 is thus provided around the floating position, thereby allowing most of floating droplets to be selectively collected.

Embodiment 3

Figure 7:
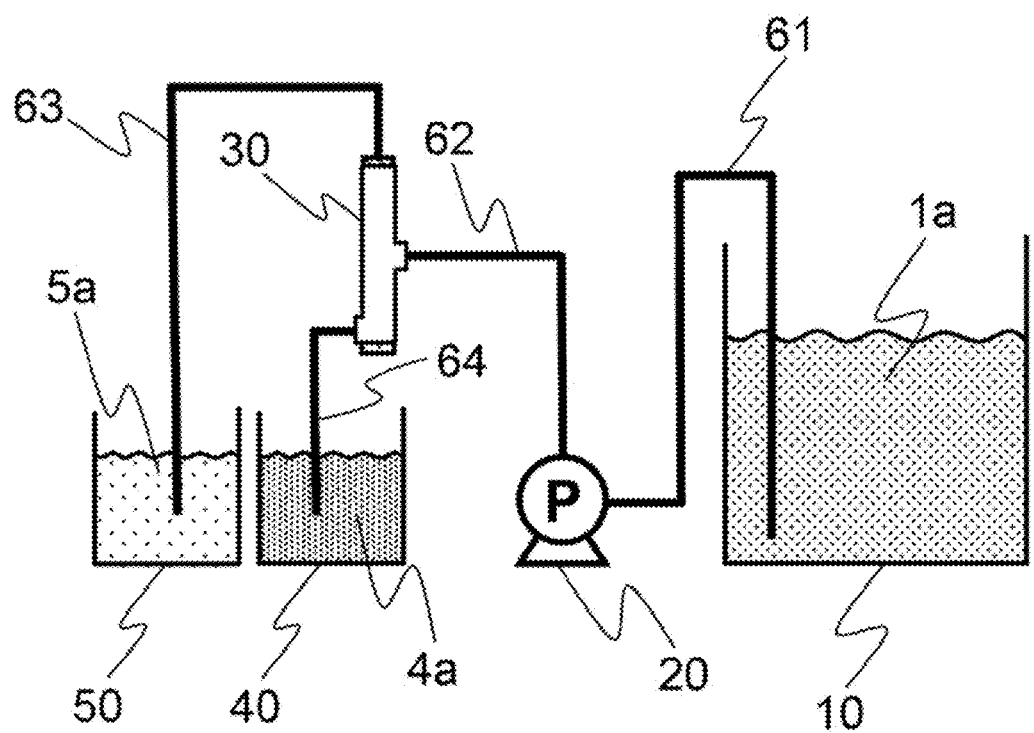
FIG. 7 shows an example of a process configuration diagram in the case of using a suspension processing device using ultrasonic waves.

In this embodiment, an example of a suspension processing device of Embodiment 3 using ultrasonic waves is described.
(Configuration of Suspension Processing Device)
FIG. 7 shows an example of a process configuration in the case of using a suspension processing device using ultrasonic waves.

Figure 8A:
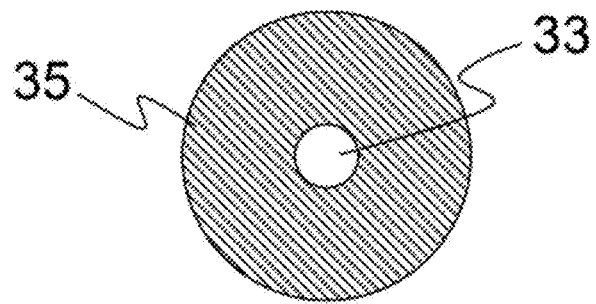
FIG. 8A is a plan view of an oscillator in a suspension processing device of Embodiment 3 using ultrasonic waves.
Figure 8B:
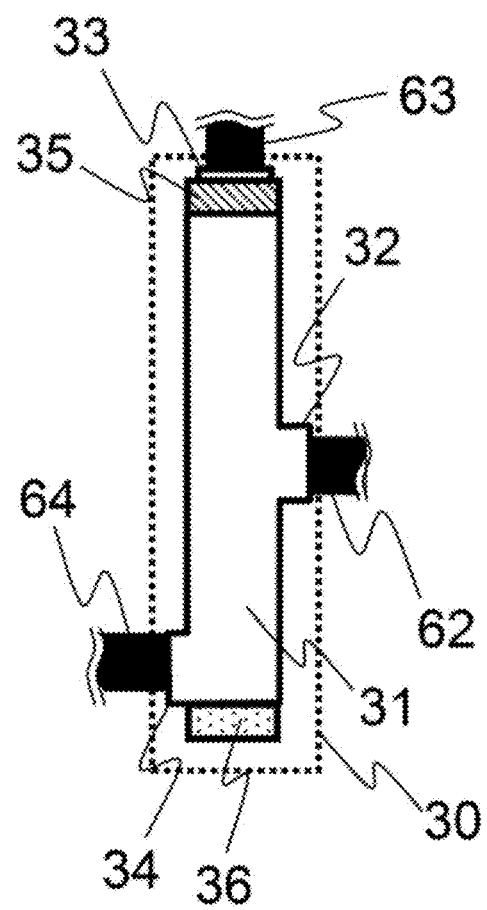
FIG. 8B is a configuration diagram of the suspension processing device of Embodiment 3 using ultrasonic waves.

FIGS. 8A and 8B are configuration diagrams of the suspension processing device using ultrasonic waves.

A tank 10 is filled with suspension 1a. The tank 10 communicates with a pump 20 through a liquid feeding tube 61. The suspension 1a fed to the pump 20 through the liquid feeding tube 61 passes through a liquid feeding tube 62, and is supplied to the suspension processing device 30.

As shown in FIG. 8B, the suspension processing device 30 includes a channel 31, a supply port 32 that communicates with the liquid feeding tube 62, an outlet port 33 that communicates with a liquid feeding tube 63, a concentrate port 34 that communicates with a liquid feeding tube 64, an oscillator 35 that generates ultrasonic waves, and a reflection plate 36 that reflects ultrasonic waves, and is arranged such that an end of the channel at which the oscillator 35 is disposed is oriented upward.

The oscillator 35 and the reflection plate 36 are arranged at opposite ends of the channel 31 of the suspension processing device 30 so as to sandwich this channel in the longitudinal axis direction. The oscillator 35 is arranged such that an oscillating surface is oriented downward to emit ultrasonic waves to the suspension in the channel 31.

As shown in FIG. 8A, the oscillator 35 has an opening on the surface. The outlet port 33 is arranged directly above the opening, and communicates with the liquid feeding tube 63. Liquid having passed through the liquid feeding tube 63 is discharged into a tank 50 shown in FIG. 7. The concentrate port 34 is disposed sideways at an end of the channel 31 nearer to the reflection plate 36. The concentrate port 34 communicates with the liquid feeding tube 64. The liquid having passed through the liquid feeding tube 64 is discharged into a tank 40 in FIG. 7.

The supply port 32 is disposed sideways on the surface of the channel 31 between the oscillator 35 and the reflection plate 36, and communicates with the liquid feeding tube 62. The suspension 1a, supplied from the supply port 32 to the channel 31, passes through this channel 31 and is then discharged to the outside of the suspension processing device 30 from the outlet port 33 or the concentrate port 34.
(Operation/Process)

Figure 9:
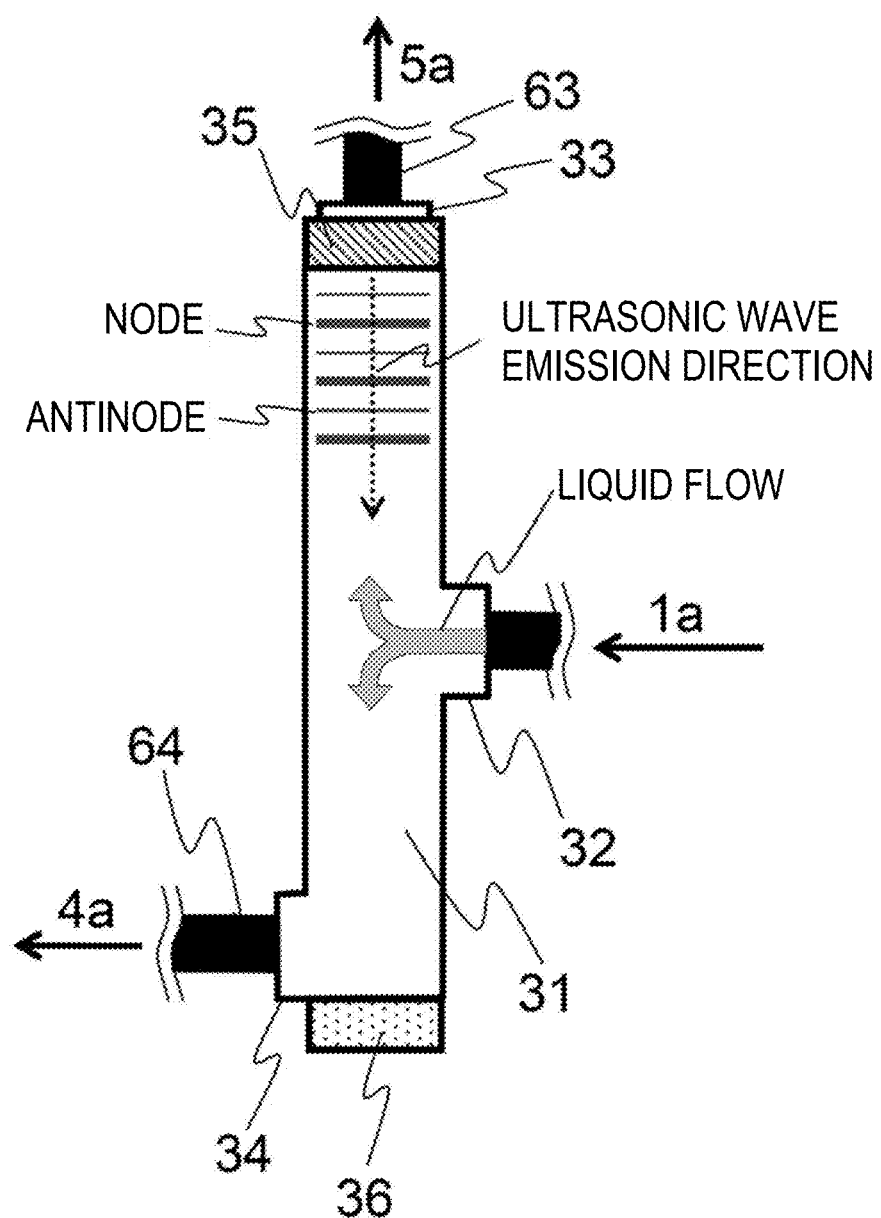
FIG. 9 is a diagram illustrating a suspension processing device using ultrasonic waves.

FIG. 9 is a diagram for illustrating an operation principle.

The oscillator 35 and the reflection plate 36 are thus arranged so as to sandwich the channel 31 in the longitudinal axis direction, and ultrasonic waves are emitted into the channel 31, thereby forming a standing wave in the channel 31. Accordingly, regions with high sound pressure (nodes) and regions with low sound pressure (antinodes) cyclically appear along the channel 31.

At this time, if liquid that fills the channel 31 contains solids sufficiently small in comparison with the intervals between antinodes and nodes, the solids receive forces toward the antinodes or nodes according to the physical property values of the solids and the solids are then captured at the positions of antinodes or nodes in the channel 31. Accordingly, while the suspension supplied from the supply port 32 passes through the channel 31, solids in the liquid are removed. The liquid is discharged from the outlet port 33 in a state of being cleared.

As the captured solids flocculate into large aggregates, the aggregates settle toward the bottom, or the reflection plate 36, of the channel 31 by their own weights. The concentrate port 34 is thus provided near the reflection plate 36, thereby allowing most of solids having settled by their own weights to be selectively collected.

As described above, the suspension 1a supplied to the channel 31 passes through this channel 31, to which the ultrasonic waves are emitted, thereby enabling the liquid to be separated into clear liquid 5a with a small number of solids in the liquid and concentrate liquid 4a with a large number of solids in the liquid and then collected. The clear liquid 5a passes through the outlet port 33 and the liquid feeding tube 63 and is discharged into the tank 50. The concentrate liquid 4a passes through the concentrate port 34 and the liquid feeding tube 64 and is discharged into the tank 40.

Advantageous Effects

Advantageous effects (processing performance) in the case of using the suspension processing device are described below. The processing performance of the suspension processing device is evaluated with reference to the turbidity of sample liquid discharged from the outlet port 33. The adopted sample liquid and output conditions of ultrasonic waves are as follows.
(1) Sample liquid: suspension that contains pure water and alumina particles having an average particle diameter of 53 micrometers dispersed therein (average turbidity: 20.3 degrees).
(2) Ultrasonic waves: a sinusoidal wave having a frequency of 2.26 MHz is generated by a function generator, amplified by a power amplifier and input into the oscillator 35.

Figure 10:
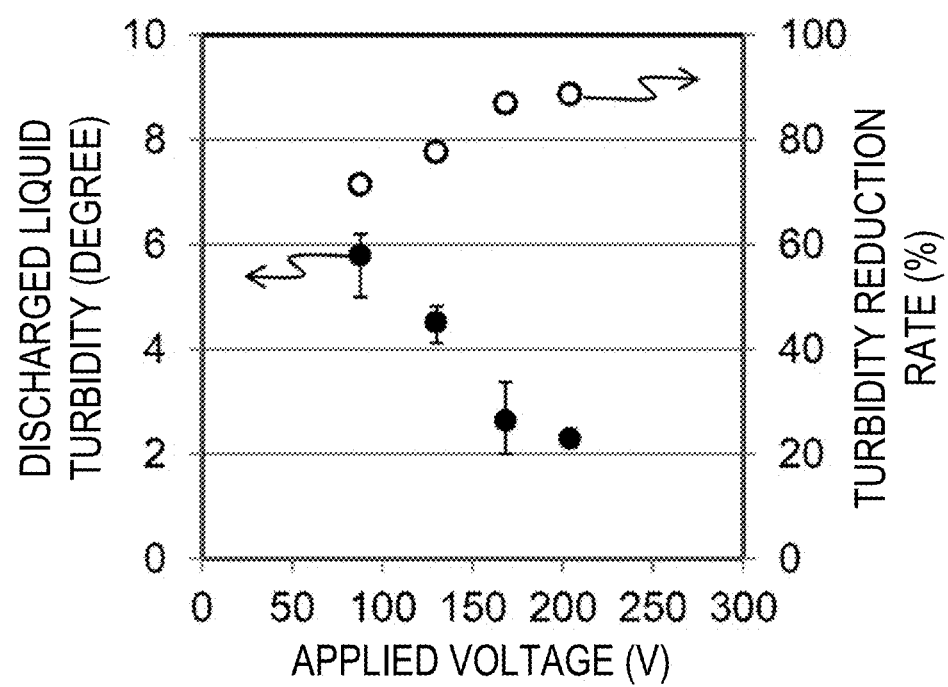
FIG. 10 is a diagram showing a result of Embodiment 3.

FIG. 10 shows applied-voltage dependence of the turbidity of the liquid 5a discharged from the outlet port 33. The horizontal axis indicates the applied voltage. The left vertical axis indicates the turbidity (degree) of the sample liquid discharged from the outlet port 33. The right vertical axis indicates the reduction rate (%) of the turbidity, that is, ((turbidity before process)−(turbidity after process))*100/(turbidity before process). As the applied voltage increases, the turbidity of the discharged liquid decreases. In the case of an applied voltage of 200 V, the turbidity of the discharged liquid decreases to about two degrees (turbidity reduction rate: about 90%).

Embodiment 4

Figure 11:
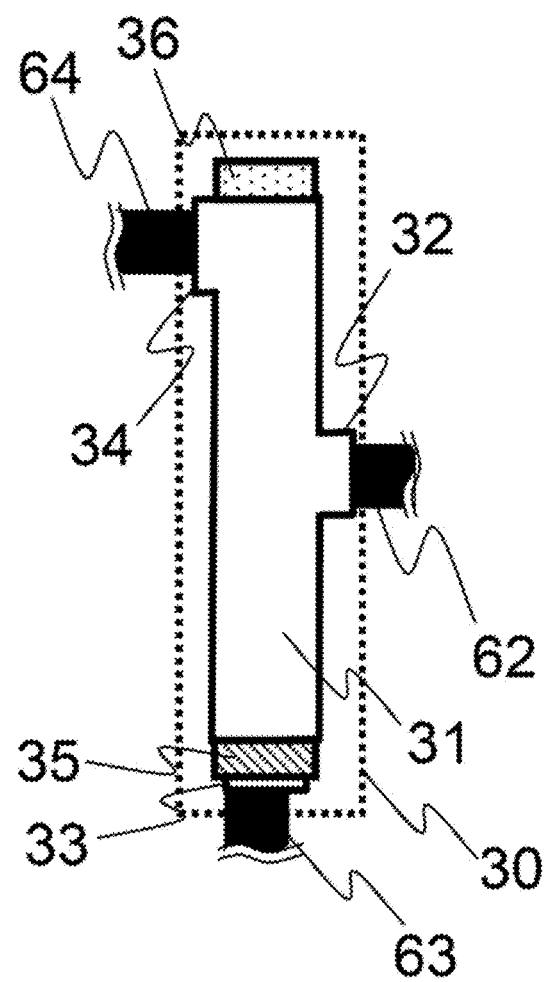
FIG. 11 is a configuration diagram of a suspension processing device of Embodiment 4 using ultrasonic waves.

In this embodiment, an example of the suspension processing device of Embodiment 4 using ultrasonic waves is described.
(Configuration of Suspension Processing Device)
FIG. 11 is a configuration diagram of a suspension processing device using ultrasonic waves.

The suspension processing device 30 includes a channel 31, a supply port 32 that communicates with a liquid feeding tube 62, an outlet port 33 that communicates with a liquid feeding tube 63, a concentrate port 34 that communicates with a liquid feeding tube 64, an oscillator 35 that generates ultrasonic waves, and a reflection plate 36 that reflects ultrasonic waves, and is arranged such that an end of the channel provided with the reflection plate 36 is oriented upward.

The oscillator 35 and the reflection plate 36 are arranged at opposite ends of the channel 31 of the suspension processing device 30 so as to sandwich this channel 31 in the longitudinal axis direction. The oscillator 35 is arranged such that an oscillating surface is oriented upward to emit ultrasonic waves to the suspension in the channel 31. The suspension processing device 30 of this embodiment also adopts a processing configuration similar to that in Embodiment 3 shown in FIG. 7.

As with Embodiment 3 shown in FIG. 8A, the oscillator 35 has an opening on the surface. The outlet port 33 is arranged directly below the opening, and communicates with the liquid feeding tube 63. Liquid having passed through the liquid feeding tube 63 is discharged into a tank 50 shown in FIG. 7. The concentrate port 34 is disposed sideways at an end of the channel 31 nearer to the reflection plate 36. The concentrate port 34 communicates with the liquid feeding tube 64. The liquid having passed through the liquid feeding tube 64 is discharged into a tank 40 shown in FIG. 7.

The supply port 32 is disposed sideways on the surface of the channel 31 between the oscillator 35 and the reflection plate 36, and communicates with the liquid feeding tube 62. The suspension 1a, supplied from the supply port 32 to the channel 31, passes through this channel 31 and is then discharged to the outside of the suspension processing device 30 from the outlet port 33 or the concentrate port 34.
(Operation/Process/Advantageous Effect)

The oscillator 35 and the reflection plate 36 are arranged parallel to each other so as to sandwich the channel 31, and ultrasonic waves are emitted into the channel 31, thereby forming a standing wave in the channel 31. Accordingly, regions with high sound pressure (nodes) and regions with low sound pressure (antinodes) cyclically appear along the channel 31.

At this time, if the channel 31 is filled with emulsion that contains droplets and a parent phase and the droplets are sufficiently smaller than the intervals of the antinodes and nodes, the droplets receive forces toward the antinodes or nodes according to the physical property values of the droplets and are then captured at the positions of antinodes or nodes in the channel 31. Here, if the captured droplets have lower densities than the parent phase has, the captured droplets flocculate and float upward. The concentrate port 34 is thus provided near the reflection plate 36, thereby allowing most of floating droplets to be selectively collected.

Embodiment 5

Figure 12A:
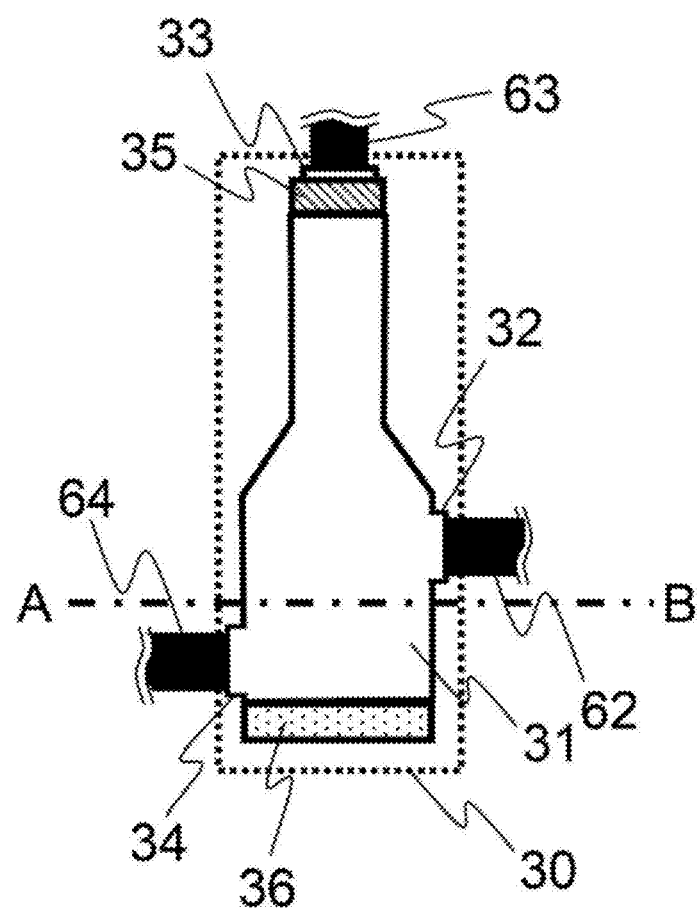
FIG. 12A is a configuration diagram of a suspension processing device of Embodiment 5 using ultrasonic waves.

In this embodiment, an example of a suspension processing device of Embodiment 5 using ultrasonic waves is described.
(Configuration of Suspension Processing Device)
FIG. 12A is a configuration diagram of the suspension processing device using ultrasonic waves.

The suspension processing device 30 includes a channel 31 having a taper, a supply port 32 that communicates with a liquid feeding tube 62, an outlet port 33 that communicates with a liquid feeding tube 63, a concentrate port 34 that communicates with a liquid feeding tube 64, an oscillator 35 that generates ultrasonic waves, and a reflection plate 36 that reflects ultrasonic waves, and is arranged such that an end of the channel provided with the oscillator 35 is oriented upward.

The oscillator 35 and the reflection plate 36 are arranged at opposite ends of the channel 31 of the suspension processing device 30 so as to sandwich this channel 31 in the longitudinal axis direction. The oscillating surface of the oscillator 35 is arranged so as to emit ultrasonic waves to the suspension in the channel 31. The suspension processing device 30 of this embodiment also adopts a processing configuration similar to that in Embodiment 3 shown in FIG. 7.

As with Embodiment 3 shown in FIG. 8A, the oscillator 35 has an opening on the surface. The outlet port 33 is arranged directly above the opening, and communicates with the liquid feeding tube 63. Liquid having passed through the liquid feeding tube 63 is discharged into a tank 50 shown in FIG. 7. The concentrate port 34 is disposed sideways at an end of the channel 31 nearer to the reflection plate 36. The concentrate port 34 communicates with the liquid feeding tube 64. The liquid having passed through the liquid feeding tube 64 is discharged into a tank 40 shown in FIG. 7.

Figure 12B:
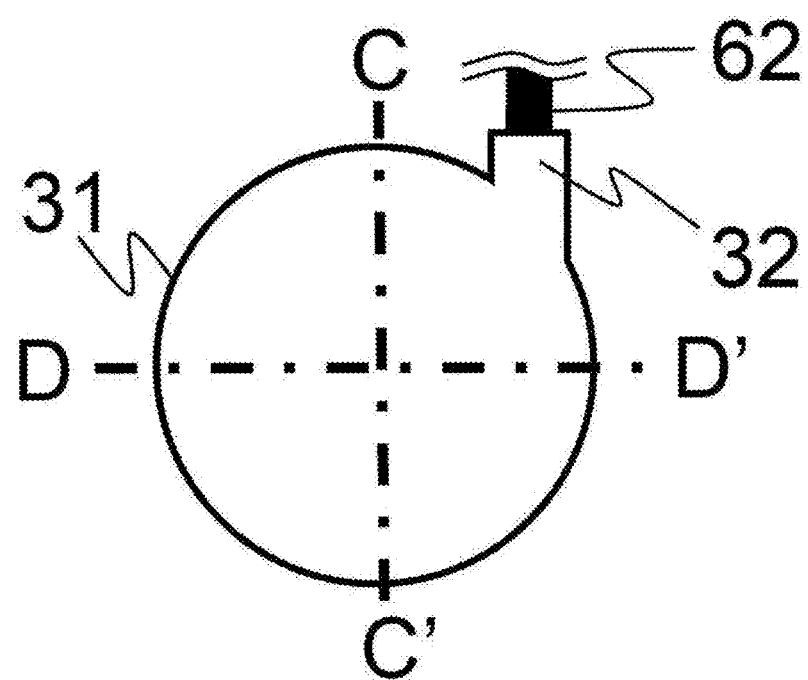
FIG. 12B is an arrangement diagram of a supply port in the suspension processing device of Embodiment 5 using ultrasonic waves.

The supply port 32 is disposed sideways on the surface of the channel 31 between the oscillator 35 and the reflection plate 36, and communicates with the liquid feeding tube 62. FIG. 12B shows a cross-sectional view taken along AB plane. The supply port 32 is disposed at a position deviating from the central axis CC' or DD' of the channel 31.

The suspension 1a, supplied from the supply port 32 to the channel 31, passes through this channel 31 and is then discharged to the outside of the suspension processing device 30 from the outlet port 33 or the concentrate port 34.

(Operation/Process/Advantageous Effect)

The oscillator 35 and the reflection plate 36 are arranged parallel to each other so as to sandwich the channel 31, and ultrasonic waves are emitted into the channel 31, thereby forming a standing wave in the channel 31. Accordingly, regions with high sound pressure (nodes) and regions with low sound pressure (antinodes) cyclically appear along the channel 31. At this time, if liquid that fills the channel 31 contains solids sufficiently small in comparison with the intervals between antinodes and nodes, the solids receive forces toward the antinodes or nodes according to the physical property values of the solids and the solids are then captured at the positions of antinodes or nodes in the channel 31.

Figure 12C:
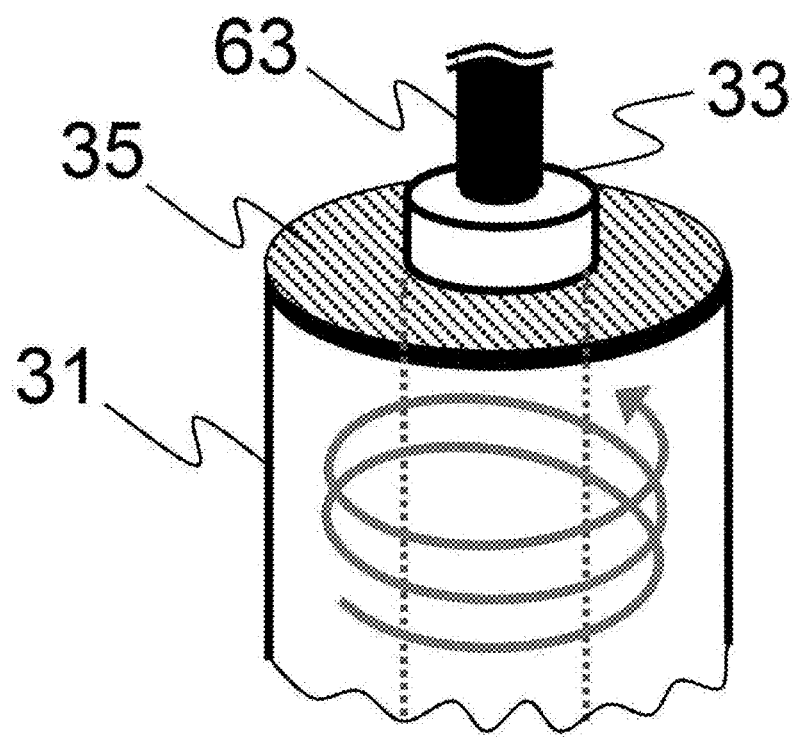
FIG. 12C is a diagram showing a swirl flow in the suspension processing device of Embodiment 5 using ultrasonic waves.

The outlet port 33 resides on the surface of the oscillator 35. Accordingly, in a region in the channel 31 directly below the outlet port 33, sound waves do not propagate. In this region, solids in the liquid cannot be captured. If a flow swirling around and away from a region directly below the outlet port 33 as shown in FIG. 12C can be generated, solids in the liquid can be effectively captured.

A taper is formed at the channel 31 as shown in FIG. 12A to deviate the supply port 32 from the central axis of the channel 31 as shown in FIG. 12B, thereby allowing the swirling flow as described above to be generated in the channel. Use of the swirling flow during the suspension clearing process can effectively capture the solids in the liquid, and improve the clearing performance of the suspension processing device.

Embodiment 6

In this embodiment, an example of a suspension processing device of Embodiment 6 using ultrasonic waves is described.

(Configuration of Suspension Processing Device)

Figure 13A:
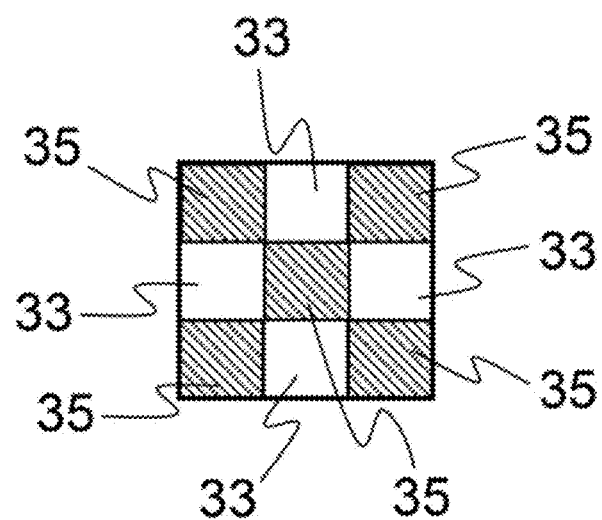
FIG. 13A is a plan view of an oscillator in a suspension processing device of Embodiment 6 using ultrasonic waves.
Figure 13B:
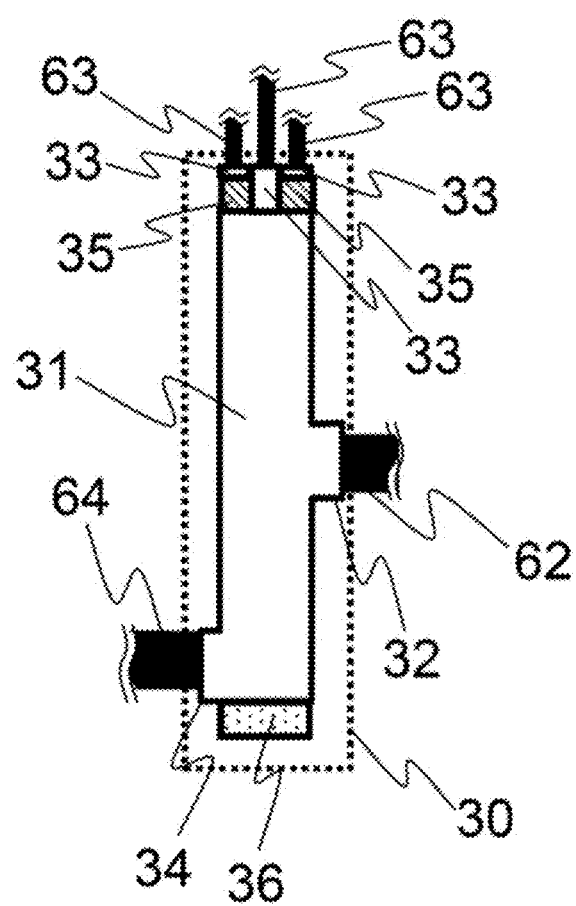
FIG. 13B is a configuration diagram of the suspension processing device of Embodiment 6 using ultrasonic waves.

FIGS. 13A and 13B are configuration diagrams of the suspension processing device using ultrasonic waves.

The suspension processing device 30 includes a channel 31, a supply port 32 that communicates with a liquid feeding tube 62, outlet ports 33 that communicate with respective liquid feeding tubes 63, a concentrate port 34 that communicates with a liquid feeding tube 64, oscillators 35 that generate ultrasonic waves, and a reflection plate 36 that reflects ultrasonic waves, and is arranged such that an end of the channel provided with the oscillators 35 is oriented upward.

The multiple oscillators 35 and the reflection plate 36 are arranged at opposite ends of the channel 31 so as to sandwich this channel 31 in the longitudinal axis direction. All the multiple oscillators 35 are disposed on the same plane. These oscillators 35 are arranged with their oscillation surfaces facing downward so as to emit ultrasonic waves to the suspension in the channel 31. As shown in FIG. 13A, the multiple outlet ports 33 are arranged on the same surface on which the oscillators 35 reside.

In the channel 31, the outlet ports 33 are arranged in parallel to the oscillators 35 at an end where these oscillators are disposed, and communicate with the respective liquid feeding tubes 63. Liquid having passed through the liquid feeding tubes 63 is discharged into a tank 50 shown in FIG. 7. The concentrate port 34 is disposed sideways at an end of the channel 31 nearer to the reflection plate 36. The concentrate port 34 communicates with the liquid feeding tube 64. The liquid having passed through the liquid feeding tube 64 is discharged into a tank 40 shown in FIG. 7.

The supply port 32 is disposed sideways on the surface of the channel 31 between the oscillators 35 and the reflection plate 36, and communicates with the liquid feeding tube 62. The suspension 1a, supplied from the supply port 32 to the channel 31, passes through this channel 31 and is then discharged to the outside of the suspension processing device 30 from the outlet port 33 or the concentrate port 34.

In general, if an oscillator is large, the oscillator surface does not uniformly oscillate, which reduces the sound pressure in a space. Accordingly, in the case of requiring a large oscillator surface, this embodiment with multiple small oscillators can improve the clearing performance of the suspension processing device more than the case of using a single oscillator.

The present invention is not limited to the foregoing embodiments, and encompasses many types of variations. For instance, the foregoing embodiments have been described in detail for illustrating the present invention, and the present invention is not necessarily limited to the case of including the entire configuration described above. Alternatively, a part of the configuration of a certain embodiment may be replaced with a configuration element of another embodiment. Moreover, the configuration of a certain embodiment may be additionally provided with a configuration element of another embodiment. Furthermore, a part of the configuration of each embodiment may be additionally provided with another configuration element, deleted, or replaced with another configuration element.

REFERENCE SIGNS LIST

10 Suspension tank
20 Liquid feeding pump
30 Suspension processing device
31 Channel
32 Suspension supply port
33 Outlet port
34 Concentrate port
35 Ultrasonic oscillator
36 Ultrasonic reflection plate
40 Concentrate liquid tank
50 Clear liquid tank
61-64 Liquid feeding tubes
1a Suspension
4a Concentrate liquid
5a Clear liquid

The invention claimed is:

1. A suspension processing device for separating and concentrating a component of solids in suspension using ultrasonic waves, comprising:
    at least one supply port for supplying the suspension into the device;
    a channel through which the suspension flows;
    at least two outlet ports for discharging processed suspension;
    an oscillator for emitting the ultrasonic waves; and
    a reflection plate for reflecting the emitted ultrasonic waves;
    wherein the at least two outlet ports include a first outlet port provided adjacent to the oscillator and a second outlet port provided adjacent to the reflection plate; and
    wherein the oscillator includes an opening in a central portion thereof through which the suspension flows, and the first outlet port is provided directly above the opening.

2. The suspension processing device according to claim 1, wherein the channel includes at least three surfaces among which at least two surfaces face each other.

3. The suspension processing device according to claim 2, wherein one surface of the two facing surfaces is provided with the oscillator and the other surface is provided with the reflection plate.

4. The suspension processing device according to claim 3, wherein the ultrasonic waves generated from the oscillator are irradiated to the suspension in the channel.

5. The suspension processing device according to claim 3, wherein the supply port is provided in proximity to the surface provided with the reflection plate.

6. The suspension processing device according to claim 5, wherein a second outlet port is provided between the first outlet port and the supply port.

7. The suspension processing device according to claim 6, wherein the solids in the suspension captured in the channel are transported in a direction from the oscillator to the reflection plate by modulating an electric signal input into the oscillator.

8. The suspension processing device according to claim 4, wherein the first outlet port is provided on the surface provided with the oscillator, and the second outlet port is provided in proximity to the surface provided with the reflection plate.

9. The suspension processing device according to claim 8, wherein the supply port is provided between the first outlet port and the second outlet port.

10. The suspension processing device according to claim 1, wherein the channel includes a narrow section, a wide section, and a tapered section in a central portion of the channel between the narrow section and the wide section.

11. The suspension processing device according to claim 10, wherein the supply port is not on a central axis in a sectional view of the channel.

12. The suspension processing device according to claim 10, wherein the narrow section is disposed between the oscillator and the tapered section, and the wide section is disposed between the reflection plate and the tapered section.

* * * * *